(12) United States Patent
    Shepelev

(10) Patent No.: US 9,594,458 B2
(45) Date of Patent: *Mar. 14, 2017

(54) SHIELDING WITH DISPLAY ELEMENTS

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,236

(22) Filed: Feb. 26, 2016

(65) Prior Publication Data

US 2016/0179290 A1    Jun. 23, 2016

Related U.S. Application Data

(63) Continuation of application No. 13/929,570, filed on Jun. 27, 2013, now Pat. No. 9,285,934.

(60) Provisional application No. 61/784,135, filed on Mar. 14, 2013.

(51) Int. Cl.
    *G06F 3/041*    (2006.01)
    *G06F 3/044*    (2006.01)

(52) U.S. Cl.
    CPC ............ *G06F 3/0418* (2013.01); *G06F 3/044* (2013.01); *G06F 2203/04107* (2013.01)

(58) Field of Classification Search
    CPC .................. G06F 3/044; G06F 3/0418; G06F 2203/04107
    USPC ..................... 178/18.01–19.07; 345/173–178
    See application file for complete search history.

(56) References Cited

U.S. PATENT DOCUMENTS

| | | | |
|---|---|---|---|
| 2010/0194695 A1 | 8/2010 | Hotelling et al. | |
| 2010/0292945 A1* | 11/2010 | Reynolds | ................ G06F 3/044 702/65 |
| 2012/0162104 A1 | 6/2012 | Chang et al. | |
| 2012/0162584 A1 | 6/2012 | Chang et al. | |
| 2013/0342770 A1 | 12/2013 | Kim et al. | |

* cited by examiner

*Primary Examiner* — Michael Pervan
(74) *Attorney, Agent, or Firm* — Patterson + Sheridan, LLP

(57) ABSTRACT

A method and apparatus for operating an input device having a touch sensor and associated display device is discussed. While performing touch sensing, inactive transmitter electrodes of the touch sensor are electrically floated, and one or more source lines from the display device are operated to achieve shielding against interference, such as that coming from a backlight underneath the touch sensor.

20 Claims, 4 Drawing Sheets

SHIELDING WITH DISPLAY ELEMENTS

CROSS-REFERENCE TO RELATED APPLICATIONS

This application is a continuation of U.S. patent application Ser. No. 13/929,570, filed Jun. 27, 2013 which claims benefit of U.S. Provisional Patent application Ser. No. 61/784,135, filed Mar. 14, 2013, which are herein incorporated by reference in their entireties.

FIELD

Embodiments of the present disclosure relate to an input device, processing system, and method for shielding during touch sensing.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE DISCLOSURE

An input device, processing system for an input device, and method for operating capacitive touch sensors are disclosed herein. In one embodiment, a display device having a plurality of transmitter electrodes configured to be driven for capacitive sensing and having a first transmitter electrode and a second transmitter electrode. The display device includes a plurality of receiver electrodes and a plurality of conductive electrodes in a thin-film-transistor (TFT) layer of the display device. The display device further includes a processing system coupled to the plurality of transmitter electrodes, the plurality of receiver electrodes. The plurality of conductive electrodes, wherein the processing system is configured to drive the first transmitter electrode with a transmitter signal, electrically float the second transmitter electrode while driving the first transmitter electrode, and receive resulting signals with the receiver electrodes, the resulting signals comprising effects corresponding to the transmitter signal. The processing system is further configured to, while driving the first transmitter electrode, at least one of: (i) drive at least one of the plurality of conductive electrodes with a first signal, and (ii) electrically float at least one of the plurality of conductive electrodes.

In another embodiment, a processing system for a display device having an integrated capacitive sensing device includes a driver module comprising driver circuitry configured to be coupled to a plurality of transmitter electrodes having a first transmitter electrode and a second transmitter electrode, and to a plurality of conductive electrodes in a thin-film-transistor (TFT) layer of the display device. The driver module is configured to drive a transmitter signal with the first transmitter electrode, while electrically floating the second transmitter electrode. The driver module is further configured to, while driving the first transmitter electrode, at least one of: (i) drive at least one of the plurality of conductive electrodes with a first signal, and (ii) electrically float at least one of the plurality of conductive electrodes. The processing system further includes a receiver module configured to be coupled to a plurality of receiver electrodes and configured to receive resulting signals with the receiver electrodes, the resulting signals comprising effects corresponding to the transmitter signal.

In another embodiment, a method for operating a display device having an integrated capacitive sensing device includes driving a first transmitter electrode with a transmitter signal for capacitive sensing. The method further includes electrically floating a second transmitter electrode while driving the first transmitter electrode. The method further includes, while driving the first transmitter electrode, at least one of: (i) driving at least one of a plurality of conductive electrodes in a thin-film-transistor (TFT) layer of the display device with a first signal, and (ii) electrically floating at least one of the plurality of conductive electrodes. The method includes receiving resulting signal from a plurality of receiving electrodes, the resulting signals comprising effects corresponding to the transmitter signal.

In another embodiment, a display device having an integrated capacitive sensing device includes a plurality of common electrodes configured to be driven for display updating and capacitive sensing. The plurality of common electrodes includes a first common electrode set corresponding to a first transmitter electrode and a second common electrode set corresponding to a second electrode. The display device includes a thin-film-transistor (TFT) layer having a plurality of conductive electrodes, and a plurality of receiver electrodes. The display device further includes a processing system coupled to the plurality of common electrodes, the plurality of receiver electrodes, and the plurality of conductive electrodes. The processing system is configured to drive the first transmitter electrode with a transmitter signal, electrically float the second transmitter electrode while driving the first transmitter electrode, while driving the first transmitter electrode, drive at least one of the plurality of conductive electrodes to a first voltage signal. The processing system is further configured to receive resulting signals with the receiver electrodes, the resulting signals comprising effects corresponding to the transmitter signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
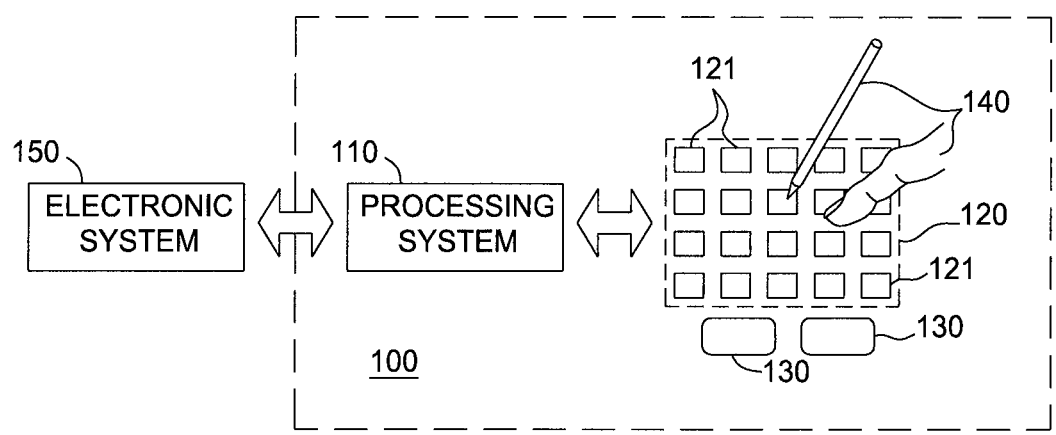
FIG. 1 is a schematic diagram of an exemplary input device, in accordance with embodiments of the disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present disclosure provide input devices and methods for decreasing settling time of the input devices. Input devices may have sensor devices that are in close proximity to a display screen, e.g., a cellular phone with a touch-enabled display screen. To operate the sensor devices to track an input object, the input device may drive a modulated electrical signal onto transmitter electrodes and detect a change in an electrical property (e.g., capacitance) between the transmitter electrodes and receiver electrodes caused by the input object. The input device may use the inactive transmitter electrodes to shield against interference coming from underneath the sensor device (e.g., from a backlight of the display screen) by connecting the inactive transmitter electrodes to an actively driven level. However, using the inactive transmitter electrodes for shielding may have a negative impact on the sensor device in other ways. Specifically, using inactive transmitter electrodes for shielding may cause the capacitive load and the settling time of the sensor device to increase. This problem may arise more frequently as input devices become bigger and have larger sensor devices and larger display screens.

To provide shielding while reducing the settling time of the sensor device, the input device may use electrodes found within the display screen to shield against interference while performing touch sensing. In one embodiment, the input device may use conductive electrodes, such as source lines, or gate lines, within the thin-film-transistor layer of the display screen to shield the sensor device from interference during touch sensing. For example, while the sensor device performs touch sensing, the input device may drive the source lines of the display screen to a level and electrically float the inactive transmitter electrodes. This technique may be applied to a number of configurations of sensor devices, including "on-cell," "full in-cell", and "hybrid in-cell" sensors, as described below.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to one or more capacitive sensing elements 121 to create an electric field between an electrode and ground. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, the processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the user input (or lack of user input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. For example, some embodiments may utilize some of the same electrical components for displaying and sensing. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
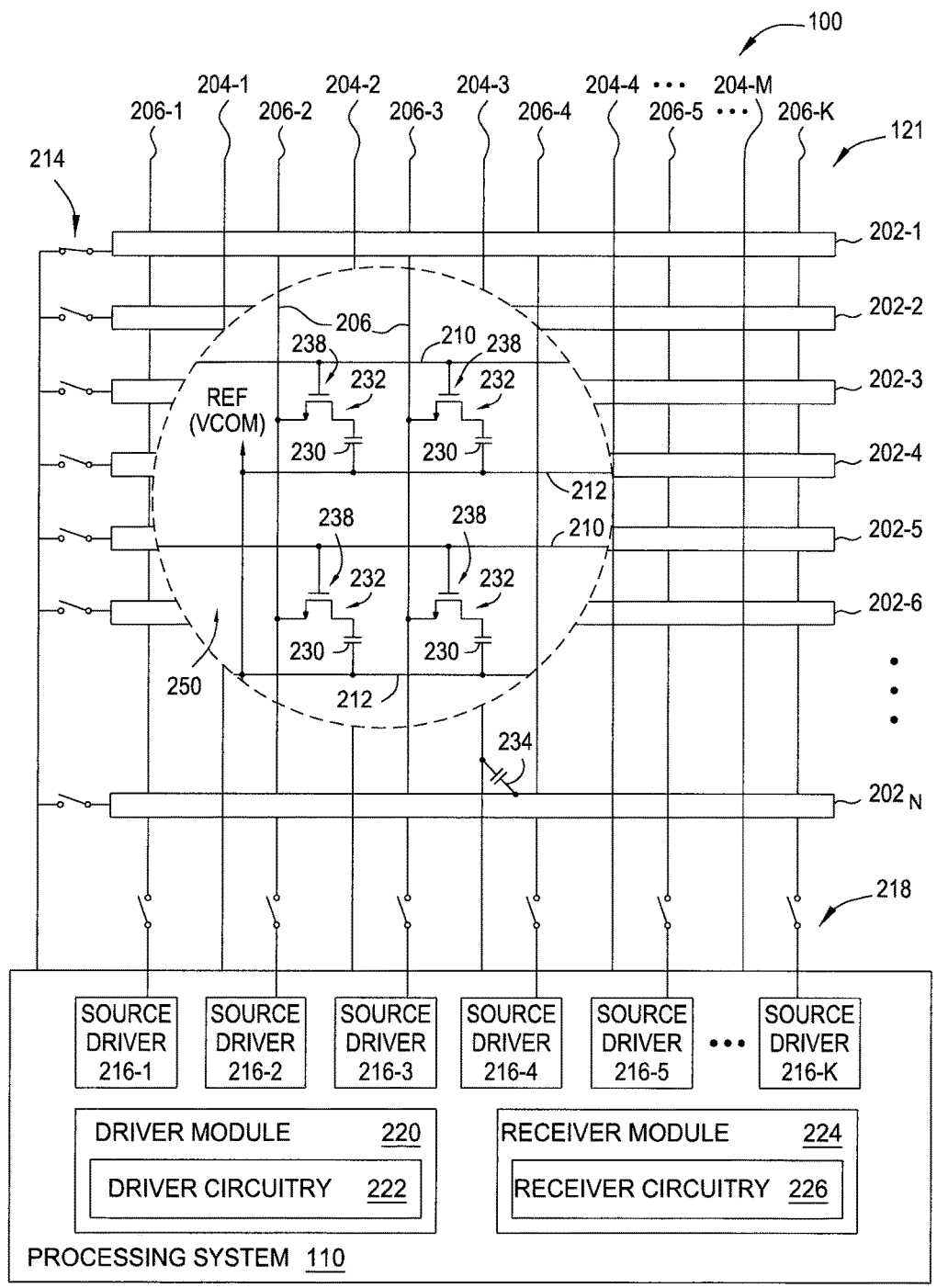
FIG. 2 illustrates the input device in greater detail, including systems for updating pixels in an associated display screen, according to one embodiment of the disclosure.

FIG. 2 shows in greater detail the input device 100 including an example pattern of sensing elements 121 configured to sense in a sensing region 120 associated with the pattern. For clarity of illustration and description, FIG. 2 shows the sensing elements 121 in a pattern of simple rectangles, and does not show various components. The sensing elements 121 may have other suitable geometry or form. The illustrated pattern of sensing elements 121 comprises a first plurality of sensor electrodes 202 (202-1, 202-2, 202-3, . . . 202-n), and a second plurality of sensor electrodes 204 (204-1, 204-2, 204-3, . . . 204-m) disposed over the first plurality of sensor electrodes 202. In one embodiment, processing system 110 is coupled to sensor electrodes 202 and 204 and is configured to transmit transmitter signals with the first plurality of sensor electrodes 202 and receive resulting signals with the second plurality of sensor electrodes 204. In such an embodiment, the first plurality of sensor electrode may be referred to as a plurality of transmitter electrodes 202 (202-1, 202-2, 202-3, . . . 202-n), and the second plurality of sensor electrodes may be referred to as a plurality of receiver electrodes 204 (204-1, 204-2, 204-3, . . . 204-m). In one embodiment, the plurality of receiver electrodes 204 may be disposed over the plurality of transmitter electrodes 202. In another embodiment, processing system 110 may be configured to transmit and receive with both the first plurality of sensor electrodes and the second plurality of sensor electrodes.

Transmitter electrodes 202 and receiver electrodes 204 are typically ohmically isolated from each other. That is, one or more insulators separate transmitter electrodes 202 and receiver electrodes 204 and prevent them from electrically shorting to each other. In some embodiments, transmitter electrodes 202 and receiver electrodes 204 are separated by insulative material disposed between them at cross-over areas; in such constructions, the transmitter electrodes 202 and/or receiver electrodes 204 may be formed with jumpers connecting different portions of the same electrode. In some embodiments, transmitter electrodes 202 and receiver electrodes 204 are separated by one or more layers of insulative material. In some other embodiments, transmitter electrodes 202 and receiver electrodes 204 are separated by one or more substrates; for example, they may be disposed on opposite sides of the same substrate, or on different substrates that are laminated together.

The areas of localized capacitive coupling between transmitter electrodes 202 and receiver electrodes 204 may be termed "capacitive pixels." The capacitive coupling between the transmitter electrodes 202 and receiver electrodes 204 change with the proximity and motion of input objects in the sensing region associated with the transmitter electrodes 202 and receiver electrodes 204.

In some embodiments, the sensor pattern is "scanned" to determine these capacitive couplings. That is, the transmitter electrodes 202 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 204 to be independently determined.

The receiver electrodes 204 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 202 comprise one or more common electrodes (e.g., "V-com electrodes" or segments of a segmented V-com electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 202 comprises one or more common electrodes. In other embodiments, at least two transmitter electrodes 202 may share at least one common electrode. An example embodiment having transmitter electrodes 202 that comprise one or more common electrodes 212 is discussed later in conjunction with FIG. 3.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

In one embodiment, the processing system 110 is configured to operate the hardware of the input device 100 to detect input in the sensing region-e.g., some portion of the display screen. In the embodiment shown, the processing system 110 includes at least a driver module 220 and a receiver module 224 coupled to the plurality of transmitter electrodes 202 and the plurality of receiver electrodes 204. The driver module 220 may include driver circuitry 222 coupled to the transmitter electrodes 202 and configured to drive the hardware components for capacitive sensing and for display updating. In some embodiments, the driver module 220 may be implemented as a capacitive sensing controller module communicatively coupled to a separate display driver controller, or as a single controller configured to provide both capacitive sensing and display updating.

In past approaches, when one or more transmitter electrodes are driven for capacitive sensing, inactive transmitter electrodes are driven to a shielding level (e.g., ground, V-com) to provide shielding. However, as the RC time of a capacitive sensor is generally determined by the resistive and capacitive properties of all sensor electrodes involved during touch sensing, connecting the inactive transmitter electrodes to a level may increase the total capacitive load of the sensor device. Specifically, the inactive transmitter electrodes driven for shielding may be cross-coupled to the receiver electrode by a capacitance 234 (i.e., $C_T$) between each intersection of a receiver electrode and a transmitter electrode, thereby increasing the capacitive load of the entire sensor device. As such, as the number of transmitter electrodes in sensor devices increases, for example, due to the sensor devices themselves being made in larger sizes, this effect on capacitive load and the corresponding impact on settling time of the sensor device also increases. Accordingly, embodiments of the present disclosure provide a technique for shielding in an input device which also reduces the capacitive load and results in a faster settling time for the capacitive sensor.

In one embodiment, the driver module 220 is configured to drive one or more transmitter electrodes with a transmitter signal for capacitive sensing, while electrically floating at least one other transmitter electrode (e.g., connecting to an infinite input impedance). In the embodiment shown in FIG. 2, the driver module 220 includes logic 214, depicted as a set of switches, that determines a state of each transmitter electrode 202 as being driven with a transmitter signal or as being electrically floated. For example, the driver module 220 may drive a first transmitter electrode 202-1, while electrically floating the at least one of the other "inactive" transmitter electrodes 202-2, 202-3, 202-4, . . . 202-N, as represented by the state of the switches in logic 214. The set of switches depicted for logic 214 may be external to the driver module 220 as shown in FIG. 2 (e.g., residing in either components communicately coupled to the driver module 220 or directly on glass), or in other embodiments, may be internal to driver module 220.

In one embodiment, the receiver module 224 having receiver circuitry 226 is coupled to the plurality of receiver electrodes 204. The receiver module 208 is configured to receive resulting signals from the plurality of receiver electrodes 204 when performing capacitive sensing within the sensing region 120. In one embodiment, the processing system 110 is further configured to determine positional information based on resulting signals. In some embodiments, the processing system 110 may be configured to generate an indication of object presence in the sensing region 120 based on resulting signals received by the receiver electrodes 204.

According to one embodiment, the input device 100 includes a system 250 for updating a plurality of pixels 232 in a display device. In one embodiment, at least a portion of elements of the plurality of pixels 232 may be disposed on a thin-film-transistor (TFT) substrate of the display device. The schematic view of FIG. 2 illustrates a system 250 that includes a plurality of source drivers 216 (e.g., 216-1, 216-2, . . . 216-K) coupled to the pixels 232 by a plurality of conductive electrodes in the TFT substrate referred to as source lines 206 (e.g., 206-1, 206-1, . . . 206-K). Row select logic (not shown), also referred to as gate selection logic, may select one of the rows of pixels 232 by activating respective transistor switches 238 in the pixels 232 via conductive electrodes in the TFT substrate referred to as gate lines 210.

When activated, the transistor switches 238 of the pixels 232 enable a conductive path, through the source lines 206, which source drivers 216 may drive a desired voltage across the capacitors 230. The voltage of the capacitors 230 is defined by the voltage difference between the voltage on the source lines 206 and a reference voltage (e.g., V-com). In one embodiment, the pixels 232 are coupled to the reference voltage (e.g., V-com) via one or more conductive electrodes referred to as V-com electrodes 212. In one embodiment, the capacitance of capacitors 230 may be based on, at least in part, liquid crystal material used to set the color associated with the pixels 232. However, the embodiments described herein are not limited to any particular display technology and may be used, for example, with LED (light emitting diode), OLED (organic light-emitting diode), CRT (cathode ray tube), plasma, EL (electroluminescent), or other display technology.

The row select logic may raster through the individual rows of the display screen until all the pixels 232 have been updated. For example, row select logic may activate a single row of pixels 232 using an individual gate line 210. In response, the source drivers 216 may drive respective voltages onto the source lines 206 that generate a desired voltage (relative to the reference voltage) across the capacitors 230 in the selected row of pixels 232. The row select logic may then de-activate the previously selected row of pixels 232 and the source drivers 216 may be controlled, for example, by a display driver module on the processing system 110 such that the source drivers 216 provides the correct voltage for the pixels 232 as the row select logic activates each row of pixels 232 individually.

The processing system 110 may be configured to actively drive or electrically float one or more conductive electrodes in a TFT layer of a display device to provide shielding while the transmitter electrodes 202 are being operated for capacitive sensing. In one embodiment, the processing system 110 is configured to drive the plurality of source lines 206 with a signal while the transmitter electrodes 202 are being operated for capacitive sensing (i.e., one or more transmitter electrodes 202 are driven with a transmitter signal while the other transmitter electrodes 202 are electrically floated).

In some embodiments, the signal of the source lines 206 may be a substantially constant voltage signal (i.e., level) produced by source drivers 216. The source drivers 216 may be output source amplifiers of the driver module 220 configured to drive for both display updating and integrated touch sensing, or in other embodiments, output source amplifiers of a separate display driver module communicatively coupled to the driver module 220. In some embodiments, the signal of the source lines 206 may be based on the pixel update signal used for display updating, i.e., the signal used to generate a desired voltage across capacitors 230 of a pixel 232. In other embodiments, the signal of the source lines 206 may be produced by multiplexing the source lines 206 to a voltage level. In other embodiments, the signal of the source lines 206 may be a varying voltage signal (e.g., related to the transmitter signal driven on the transmitter electrodes). In another embodiment, the source lines 206 may be coupled to source line logic 218, depicted in FIG. 2 as a set of switches, configured to determine a state of the source lines between electrically floated and actively driven for display updating. The set of switches depicted for source line logic 218 may be external to the driver module 220 as shown in FIG. 2 (e.g., residing in either components communicately coupled to the driver module 220 or directly on glass), or in other embodiments, may be internal to driver module 220.

According to one embodiment, the pixels 232 may be separated from the plurality of transmitter electrodes 202 and receiver electrodes 204 by one or more insulated layers. In other embodiments, the sensor electrodes (i.e., the transmitter electrodes 202, the receiver electrodes 204) may be shared in functionality with display electrodes of the pixels 232, an example of which is illustrated in FIG. 3.

Figure 3:
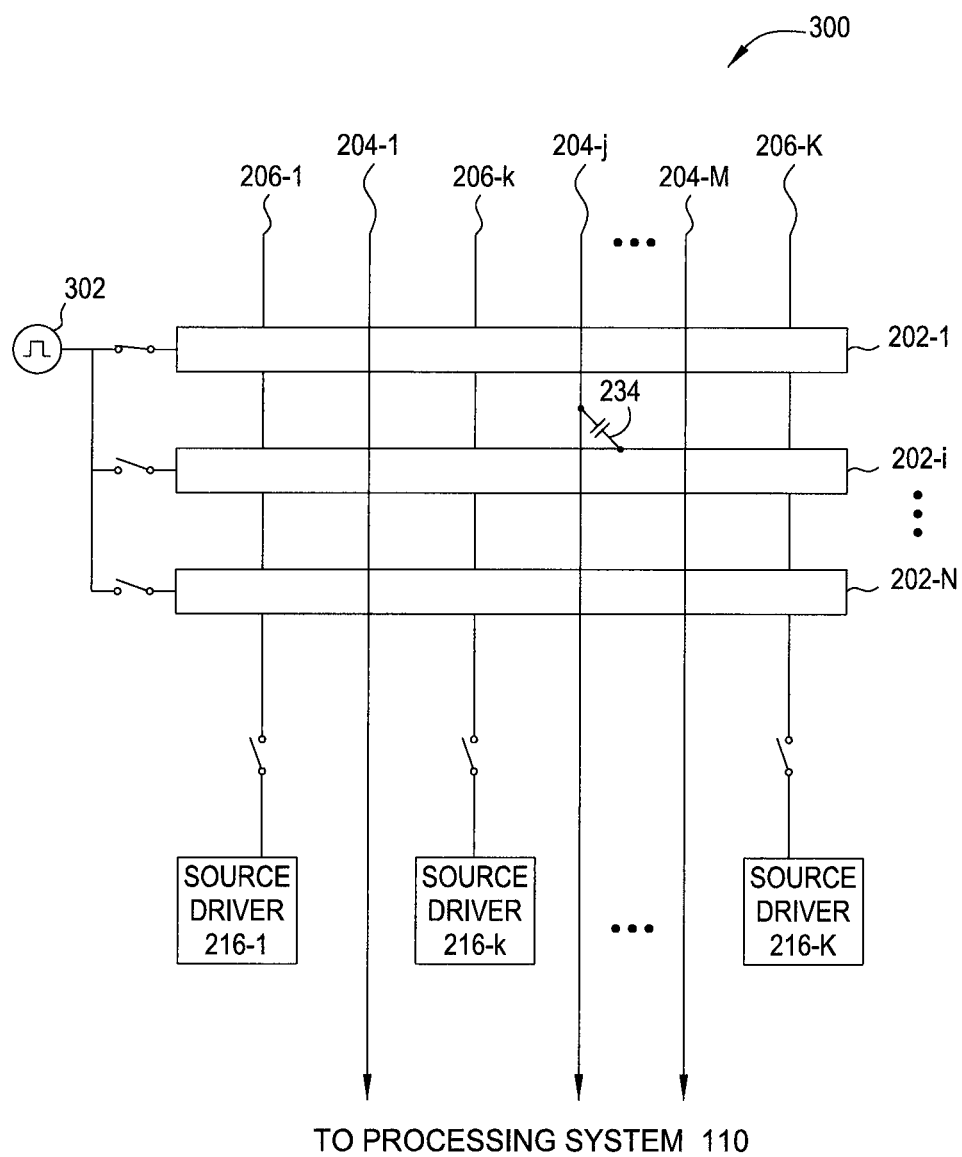
FIG. 3 illustrates an alternative embodiment of the input device configured to shield with display elements.

FIG. 3 illustrates an alternative embodiment of the input device configured to shield with display elements. FIG. 3 illustrates a system 300 where the conductive electrodes used to carry the reference voltage (e.g., V-com) are also used to carry the transmitter signals for capacitive sensing. Each transmitter electrode 202 (e.g., 202-1, 202-$i$, . . . 202-N) shown in system 300 represents one or more of the conductive electrodes (e.g., V-com electrodes 212) used to apply the reference voltage to one side of the capacitors 230 during display updating, which may further be used to transmit a modulated electrical signal 302 during capacitive sensing. In one embodiment, the transmitter electrodes 202 may be coupled to the driver module 220 for generating the transmitter signal on the common electrodes 212. In other embodiments, the driver module 220 may be coupled to the common electrodes of the transmitter electrodes via intermediate logic (not shown), such as row select logic. When updating the display, row select logic may be used to couple different common electrodes 212 to the reference voltage (e.g., V-com). As row select logic and source drivers 216 update the voltages stored in the pixels 232, the transmitter signal output of driver module 220 may be inactive (e.g., have high or infinite input impedance).

In some embodiments, the system 300 includes separate logic referred to herein as transmitter select logic, which is configured to select a transmitter electrode to drive and, in some embodiments, which transmitter electrode(s) to electrically float. In some embodiments, the system 300 may include high-level logic that includes both row select logic and transmitter select logic. A driver module 220 may be coupled to the transmitter electrodes 202 through the high-level logic or may be directly coupled to the transmitter electrodes 202.

In some embodiments, rather than be separate, the driver module 220 includes at least one of the row select logic and the transmitter select logic. In such an embodiment, instead of driving a varying voltage onto each transmitter electrode, two voltages may be selectively connected to a transmitter electrode to modulate the transmitter electrode between those two voltages. In one embodiment, at least one of the voltages selectively connected may be a reference voltage (e.g., V-com). In other embodiments, at least one of the voltages selectively connected may be a high and low transmitter signal.

In one embodiment, logic switches may be opened and closed to electrically float sets of common electrodes corresponding to transmitter electrodes 202 during capacitive sensing. For example, when performing capacitive sensing, as discussed above, one of the logic switches described earlier may be closed to allow the driver module 220 to drive a transmitter signal on the set of common electrodes corresponding to a first transmitter electrode 202-1. Further, while common electrodes corresponding to a first transmitter electrode 202-1 are being driven with transmitter signal, another logic switch may be opened to electrically float the inactive sets of common electrodes corresponding to other transmitter electrodes 202-i to 202-N, and the source lines 206 may be actively driven to a level by source drivers 216.

Although FIG. 3 illustrates connecting one row (e.g., one common electrode 212) to driver module 220, multiple common electrodes 212 may be combined or grouped into a transmitter electrode that is driven by the driver module 220. In some embodiments, the receiver electrodes 204 may be dedicated sensor electrodes for capacitive sensing, as shown in FIG. 2, or, in other embodiments, it may be desirable to use one or more electrodes in the system 300 for receiving resulting signals when capacitive sensing, such as the electrodes that carry the reference voltage.

Figure 4:
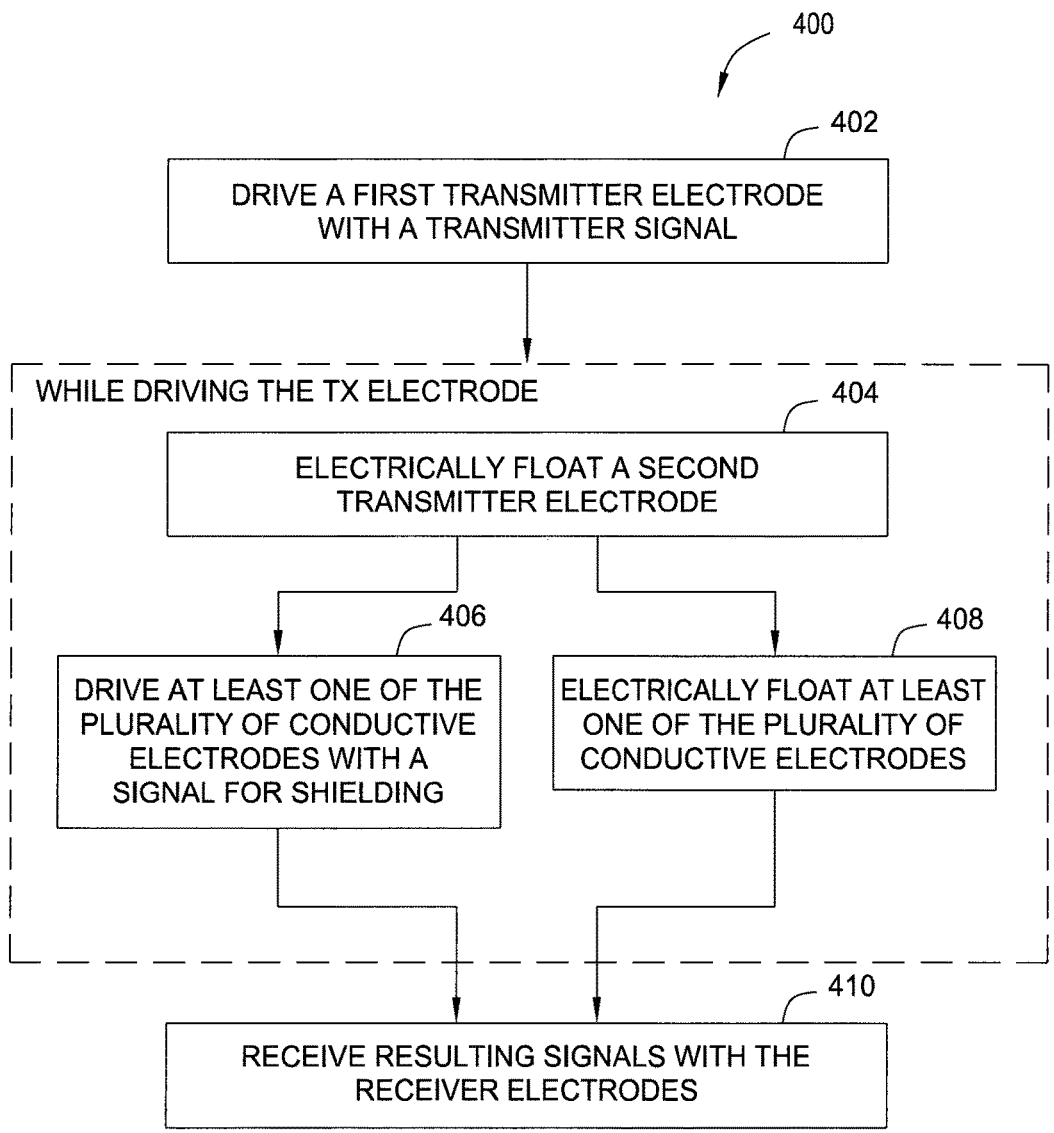
FIG. 4 is a flow diagram illustrating a method for operating an input device, according to one embodiment of the disclosure.

FIG. 4 is a flow diagram illustrating a method 400 for operating an input device having an associated display device, according to one embodiment of the disclosure. In the embodiment shown, at step 402, the processing system 110 of the input device 100 drives one or more transmitter electrodes 202 with a transmitter signal. While driving the transmitter electrode(s) 202, at step 404, the processing system 110 electrically floats a second transmitter electrode. In some embodiments, the second transmitter electrode may include those inactive transmitter electrodes not being driven with the transmitter signal.

Further while driving the transmitter electrodes 202 with the transmitter signal, the processing system 110 may operate at least one of the conductive electrodes in the TFT layer of the display device for shielding. In some embodiments, the conductive electrodes operated may be the plurality of source lines 206 found in the TFT layer of the display device. In other embodiments, the conductive electrodes operated may be the plurality of gate lines 210 found in the TFT layer of the display device, or may be any combination of source lines 206 and gate lines 210 found in the TFT layer of the display device.

In one embodiment, the processing system may operate the conductive electrodes in the TFT layer of the display device to shield against interference by, at step 406, driving at least one of the plurality of conductive electrodes with a first signal. In some embodiments, the first signal may be a substantially constant voltage signal. In other embodiments, the first signal may be a varying voltage signal. In some embodiments, the first signal may be a waveform based, at least in part, on the same transmitter signal used to drive the transmitter electrodes. For example, the first signal may be a "guard" signal being at least substantially similar to the transmitter signal used to drive the transmitter electrodes (e.g., similar frequency, similar amplitude, and/or similar phase). In another example, the first signal may have a waveform opposite relative the transmitter signal used to drive the transmitter electrodes. In other embodiments, where the conductive electrodes in the TFT layer may have been previously driven with a pixel update signal for display updating, the first signal may be based, at least in part, on the same pixel update signal.

In another embodiment, the processing system may operate the conductive electrodes in the TFT layer of the display device to shield against interference by, at step 408, electrically floating at least one of the plurality of conductive electrodes.

At step 410, the receiver module of the processing system receives a resulting signal from at least one of the receiver electrodes. The processing system 110 may generate an indication of an object presence in the sensing region 120 based on the resulting signal.

While embodiments described herein utilize the source lines of the TFT layer to shield against interference during capacitive sensing, in some embodiments, it may be desired to use the plurality of gate lines of the TFT layer, instead of or in conjunction with the source lines, to shield against interference. In such an embodiment, the plurality of gate lines 210 can be held at level (e.g., high or low voltages) while performing touch sensing to provide shielding.

In one embodiment, the conductive electrodes of the TFT layer used to shield against interference may be determined based on an orientation of the receiver electrodes of the input device. In the embodiment shown in FIG. 2, the plurality of source lines 206 of the display device may be used for shielding because the source lines 206 have an orientation that is aligned with the plurality of receiver electrodes 204. In other embodiments, for example, in input devices having a "landscape" configuration where the receiver electrodes may be oriented horizontally along the width of the input device, the plurality of gate lines 210 may be used for shielding because the gate lines 210 are aligned in the same direction as the receiver electrodes.

Accordingly, embodiments of the present disclosure provide a technique for shielding while performing touch sensing that achieves faster settling of touch sensors than previous approaches. Inactive transmitter electrodes are floated, thereby reducing the capacitive load of the touch sensor, yet shielding effects are still achieved by driving the display source lines to a level or electrically floating the display source lines. It should be appreciated that the faster settling for the touch sensor enables better mitigation of interference, as the faster settling allows the touch sensor to be driven with higher frequencies and have more touch samples filtered per transmission. From a time-budget perspective, the amount of time available to perform touch sensing can be greatly reduced in larger displays (e.g., as measured in diagonal sizes) and/or higher resolution displays. As such, the faster settling allows the touch sensor to capture the needed amount of touch samples in a shorter amount of time.

While the foregoing is directed to embodiments of the present disclosure, other and further embodiments of the disclosure may be devised without departing from the basic scope thereof, and the scope thereof is determined by the claims that follow.

The invention claimed is:

1. A processing system for a display device having an integrated capacitive sensing device, the processing system configured to couple to a plurality of sensor electrodes and a plurality of conductive electrodes of the display device, the processing system further configured to:
   drive a first sensor electrode of the plurality of sensor electrodes with a first signal for capacitive sensing;
   while driving the first sensor electrode of the plurality of sensor electrodes with the first signal for capacitive sensing, drive at least one conductive electrode of the plurality of conductive electrodes with a guard signal, wherein the guard signal comprises a varying voltage signal and is similar to the first signal, wherein each of the plurality of sensor electrodes comprises at least one common electrode of a plurality of common electrodes of the display device, wherein the plurality of common electrodes are driven for display updating and capacitive sensing, and wherein the at least one conductive electrode of the plurality of conductive electrodes comprises one of a source line or a gate line; and
   while driving the at least one conductive electrode of the plurality of conductive electrodes with the guard signal, electrically float at least one other conductive electrode of the plurality of conductive electrodes, wherein the at least one other conductive electrode of the plurality of conductive electrodes comprises the other one of the source line or the gate line.

2. The processing system of claim 1, wherein driving the first sensor electrode with the first signal for capacitive sensing comprises driving the first sensor electrode to detect changes in absolute capacitance.

3. The processing system of claim 1, wherein the first signal comprises a transmitter signal, wherein the processing system is further configured to receive resulting signals with a receiver, and wherein the resulting signals comprise effects corresponding to the transmitter signal.

4. The processing system of claim 3, wherein while the first sensor electrode is driven with the transmitter signal for capacitive sensing, a second sensor electrode of the plurality of sensor electrodes is electrically floated.

5. The processing system of claim 1, wherein the at least one conductive electrode of the plurality of conductive electrodes comprises a source line, and wherein the at least one other conductive electrode of the plurality of conductive electrodes comprises a gate line.

6. The processing system of claim 1, wherein the at least one conductive electrode of the plurality of conductive electrodes comprises a gate line, and wherein the at least one other conductive electrode of the plurality conductive electrodes comprises a source line.

7. The processing system of claim 1, wherein the varying voltage signal and the first signal comprise at least one of: a similar frequency, a similar amplitude, or a similar phrase.

8. An input device comprising:
   a plurality of sensor electrodes, wherein each of the plurality of sensor electrodes comprises at least one common electrode of a plurality of common electrodes of the input device, and wherein the plurality of common electrodes are driven for display updating and capacitive sensing;
   a plurality of conductive electrodes of the input device; and
   a processing system configured to couple to the plurality of sensor electrodes and the plurality of conductive electrodes, wherein the processing system is further configured to:
      drive a first sensor electrode of the plurality of sensor electrodes with a first signal for capacitive sensing;
      while driving the first sensor electrode of the plurality of sensor electrodes with the first signal for capacitive sensing, drive at least one of the plurality of conductive electrodes with a guard signal, wherein the guard signal comprises a varying voltage signal and is similar to the first signal, and wherein the at least one conductive electrode of the plurality of conductive electrodes comprises one of a source line or a gate line; and
      while driving the at least one conductive electrode of the plurality of conductive electrodes with the guard signal, electrically float at least one other conductive electrode of the plurality of conductive electrodes, wherein the at least one other conductive electrode of the plurality of conductive electrodes comprises the other one of the source line or the gate line.

9. The input device of claim 8, wherein the plurality of sensor electrodes are disposed in a matrix array of rectangles of a same size and shape.

10. The input device of claim 8, wherein driving the first sensor electrode with the first signal for capacitive sensing comprises driving the first sensor electrode to detect changes in absolute capacitance.

11. The input device of claim 8, wherein the first signal comprises a transmitter signal, wherein the processing system is further configured to receive resulting signals with a receiver electrode, and wherein the resulting signals comprise effects corresponding to the transmitter signal.

12. The input device of claim 11, wherein while the first sensor electrode is driven with the transmitter signal for capacitive sensing, a second sensor electrode of the plurality of sensor electrodes is electrically floated.

13. The input device of claim 11, wherein the receiver electrode comprises at least one common electrode of the plurality of common electrodes.

14. The input device of claim 11, wherein the receiver electrode and the plurality of sensor electrodes are disposed on different layers within the input device.

15. The input device of claim 8, wherein the at least one conductive electrode of the plurality of conductive electrodes comprises a source line, and wherein the at least one other conductive electrode of the plurality of conductive electrodes comprises a gate line.

16. The input device of claim 8, wherein the at least one conductive electrode of the plurality of conductive electrodes comprises a gate line, and wherein the at least one other conductive electrode of the plurality conductive electrodes comprises a source line.

17. The input device of claim 8, wherein the varying voltage signal and the first signal comprise at least one of: a similar frequency, a similar amplitude, or a similar phrase.

18. A method for operating a display device having an integrated capacitive sensing device, the method comprising:
   driving a first sensor electrode of a plurality of sensor electrodes with a first signal for capacitive sensing, wherein each of the plurality of sensor electrodes comprises at least one common electrode of a plurality of common electrodes of the display device, and wherein the plurality of common electrodes are driven for display updating and capacitive sensing;
   while driving the first sensor electrode of the plurality of sensor electrodes with the first signal for capacitive sensing, driving at least one conductive electrode of a plurality of conductive electrodes with a guard signal, wherein the guard signal comprises a varying voltage signal and is similar to the first signal, and wherein the at least one conductive electrode of the plurality of conductive electrodes comprises one of a source line or a gate line; and while driving the at least one conductive electrode of the plurality of conductive electrodes with the guard signal, electrically floating at least one other conductive electrode of the plurality of conductive electrodes, wherein the at least one other conductive electrode of the plurality of conductive electrodes comprises the other one of the source line or the gate line.

19. The method system of claim 18, wherein driving the first sensor electrode with the first signal for capacitive sensing comprises driving the first sensor electrode to detect changes in absolute capacitance.

20. The method system of claim 18, wherein the first signal comprises a transmitter signal, wherein the method further comprises receiving resulting signals with a receiver electrode, wherein the resulting signals comprise effects corresponding to the transmitter signal, and wherein while the first sensor electrode is driven for capacitive sensing, a second sensor electrode of the plurality of sensor electrodes is electrically floated.

* * * * *